United States Patent
Shiroma

(10) Patent No.: US 10,525,540 B2
(45) Date of Patent: Jan. 7, 2020

(54) CUTTING INSERT AND CUTTING TOOL

(71) Applicant: TUNGALOY CORPORATION, Fukushima (JP)

(72) Inventor: Hikaru Shiroma, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 0 days.

(21) Appl. No.: 16/039,162

(22) Filed: Jul. 18, 2018

(65) Prior Publication Data

US 2019/0061024 A1   Feb. 28, 2019

(30) Foreign Application Priority Data

Aug. 29, 2017  (JP) ................. 2017-164547

(51) Int. Cl.
| | |
|---|---|
| B23C 5/10 | (2006.01) |
| B23C 5/24 | (2006.01) |
| B23C 5/22 | (2006.01) |
| B23C 5/20 | (2006.01) |

(52) U.S. Cl.
CPC .............. *B23C 5/207* (2013.01); *B23C 5/109* (2013.01); *B23C 5/223* (2013.01); *B23C 2200/0461* (2013.01); *B23C 2200/123* (2013.01); *B23C 2200/203* (2013.01); *B23C 2200/243* (2013.01); *B23C 2200/246* (2013.01); *B23C 2200/361* (2013.01); *B23C 2210/203* (2013.01); *B23C 2222/28* (2013.01)

(58) Field of Classification Search
CPC ..... B23C 5/202; B23C 5/207; B23C 2220/24; B23C 2220/243; B23C 2220/246; B23C 2220/283; B23B 2220/242; B23B 2220/245
See application file for complete search history.

(56) References Cited

U.S. PATENT DOCUMENTS

| | | | | |
|---|---|---|---|---|
| 6,669,412 | B1 * | 12/2003 | Hirose | B23C 5/2221 407/113 |
| 7,765,902 | B2 * | 8/2010 | Kuroda | B23B 27/145 407/113 |
| 7,972,091 | B2 * | 7/2011 | Svenningsson | B23C 5/10 407/113 |
| 8,556,546 | B2 * | 10/2013 | Smilovici | B23C 5/06 407/42 |

(Continued)

FOREIGN PATENT DOCUMENTS

| | | | |
|---|---|---|---|
| JP | 62208817 A | * | 9/1987 |
| JP | 2015-193049 A | | 11/2015 |
| WO | 2017/073590 A1 | | 5/2017 |

*Primary Examiner* — Nicole N Ramos
(74) *Attorney, Agent, or Firm* — Studebaker & Brackett PC

(57) ABSTRACT

The present invention provides a cutting insert in which suitable honing is formed on a cutting edge. The cutting insert is provided with: two end surfaces opposing each other; a peripheral side surface extending between the two end surfaces; and a cutting edge formed on an intersecting ridge between at least one of the two end surfaces and the peripheral side surface. The cutting edge at least includes a major cutting edge and an inner cutting edge. Honing is provided on the major cutting edge and the inner cutting edge. A width of second honing of the inner cutting edge is narrower than a width of first honing of the major cutting edge, as viewed from a side of the end surfaces.

8 Claims, 10 Drawing Sheets

(56) References Cited

U.S. PATENT DOCUMENTS

| | | | | |
|---|---|---|---|---|
| 8,696,263 B2* | 4/2014 | Saji | ................ | B23C 5/109 407/113 |
| 8,740,518 B2* | 6/2014 | Ishi | ................ | B23C 5/109 407/113 |
| 8,950,984 B2* | 2/2015 | Choi | ................ | B23C 5/202 407/114 |
| 10,239,134 B2* | 3/2019 | Saji | ................ | B23C 5/2472 |
| 10,335,872 B2* | 7/2019 | Oikawa | ................ | B23C 5/2221 |
| 2003/0170079 A1* | 9/2003 | Daiguji | ................ | B23C 5/006 407/34 |
| 2004/0223818 A1* | 11/2004 | Sheffler | ................ | B23C 5/109 407/48 |
| 2007/0071560 A1* | 3/2007 | Karonen | ................ | B23B 27/16 407/34 |
| 2012/0282048 A1* | 11/2012 | Kountanya | ................ | B23B 27/145 407/113 |
| 2014/0334890 A1* | 11/2014 | Takahashi | ................ | B23C 5/109 407/114 |
| 2018/0339350 A1* | 11/2018 | Mura | ................ | B23C 5/207 |
| 2019/0030629 A1* | 1/2019 | Vlcek | ................ | B23C 5/207 |
| 2019/0047059 A1* | 2/2019 | Shiroma | ................ | B23C 5/109 |

\* cited by examiner

CUTTING INSERT AND CUTTING TOOL

BACKGROUND

Field

The present invention relates to a cutting insert and a cutting tool.

Description of Related Art

In cutting processes of a mold and the like, for example, an indexable end mill is used as a cutting tool. A cutting tool of this type is provided with a tool body having an approximately columnar shape and a cutting insert mounted to a leading end part of the tool body in an axial direction.

In such a cutting tool, when a cutting edge of the cutting insert is pointed, the cutting insert is susceptible to chipping during machining. Therefore, fracture resistance is increased by subjecting the cutting edge to a process of making the edge less pointed (honing). Honing includes rounding, chamfering, and a combination thereof (refer to WO 2017/073590).

SUMMARY

Some cutting inserts are provided with a so-called inner cutting edge on an inner side of a major cutting edge in order to accommodate ramping in which a cutting tool is moved diagonally downward, plunging in which the cutting tool is moved directly downward, and the like.

In such a cutting insert, honing is generally uniformly applied across an entire cutting edge. However, since the inner cutting edge has a lower cutting load than the major cutting edge and is less susceptible to edge fracture, a more-than-necessary amount of honing ends up being applied to a conventional inner cutting edge. In this case, cutting resistance of the inner cutting edge increases or wear of the inner cutting edge is promoted, thereby reducing product life of the cutting insert.

The present application has been made in consideration of such issues, and an object thereof is to provide a cutting insert and a cutting tool in which appropriate honing is formed on a cutting edge.

A cutting insert according to an aspect of the present invention is provided with: two end surfaces opposing each other; a peripheral side surface extending between the two end surfaces; and a cutting edge formed on an intersecting ridge between at least one of the two end surfaces and the peripheral side surface, wherein the cutting edge continuously includes a first corner cutting edge, a major cutting edge, an end cutting edge, an inner cutting edge, and a second corner cutting edge in this order, honing is provided on the first corner cutting edge, the major cutting edge, the end cutting edge, the inner cutting edge, and the second corner cutting edge, a width of the honing of the inner cutting edge is narrower than a width of the honing of the first corner cutting edge, the major cutting edge, and the end cutting edge, as viewed from a side of the end surface, the first corner cutting edge is connected to another first intersecting ridge between the end surface and the peripheral side surface, the other first intersecting ridge being located on an opposite side to the major cutting edge, and the second corner cutting edge is connected to another second intersecting ridge between the end surface and the peripheral side surface, the other second intersecting ridge being located on an opposite side to the inner cutting edge.

According to this aspect, since the width of the honing of the inner cutting edge is narrower than the width of the honing of the first corner cutting edge, the major cutting edge, and the end cutting edge as viewed from the side of the end surface, an increase in cutting resistance and promotion of wear due to honing can be suppressed in the inner cutting edge with a relatively low cutting load while suppressing fractures of the major cutting edge and the inner cutting edge. Therefore, the cutting edge can be provided with suitable honing.

A width of the honing of the inner cutting edge and the second corner cutting edge may be narrower than a width of the honing of the first corner cutting edge, the major cutting edge, and the end cutting edge.

A width of the honing of the second corner cutting edge may be equivalent to a width of the honing at a connecting part of the inner cutting edge which is connected to the second corner cutting edge.

The other first intersecting ridge and the other second intersecting ridge may respectively include cut surfaces, a width of the cut surface of the other first intersecting ridge, as viewed from the side of the end surface, may be narrower than a width of the honing of the first corner cutting edge, and a width of the cut surface of the other second intersecting ridge, as viewed from the side of the end surface, may be the same as a width of the honing of the second corner cutting edge.

The width of the honing of the inner cutting edge, as viewed from the side of the end surface, may gradually become narrower as a distance thereof from a connecting part connected to the end cutting edge increases. Since the inner cutting edge is subjected to a smaller cutting load as the distance from a connecting part connected to the end cutting edge increases, according to this aspect, the width of honing decreases toward a portion with a small cutting load and, accordingly, the inner cutting edge can be provided with more suitable honing.

The width of the honing of the first corner cutting edge, the major cutting edge, and the end cutting edge, as viewed from the side of the end surface, may be constant. In this case, the cutting edge can be readily formed and fracture of the cutting edge section can be sufficiently suppressed.

The width of the honing of the inner cutting edge, as viewed from the side of the end surface, may be equal to or more than 0.1 mm. In this case, fracture of the first cutting edge can be sufficiently suppressed.

A cutting insert according to another aspect is provided with: two end surfaces opposing each other; a peripheral side surface extending between the two end surfaces; and a cutting edge formed on an intersecting ridge between at least one of the two end surfaces and the peripheral side surface, wherein the cutting edge at least includes a first cutting edge and a second cutting edge, honing is provided on the first cutting edge and the second cutting edge, and a width of at least a part of the honing of the second cutting edge is narrower than a width of the honing of the first cutting edge, as viewed from a side of the end surface.

A cutting tool according to another aspect is provided with: a tool body; and the cutting insert described above mounted to the tool body.

DETAILED DESCRIPTION

Figure 1:
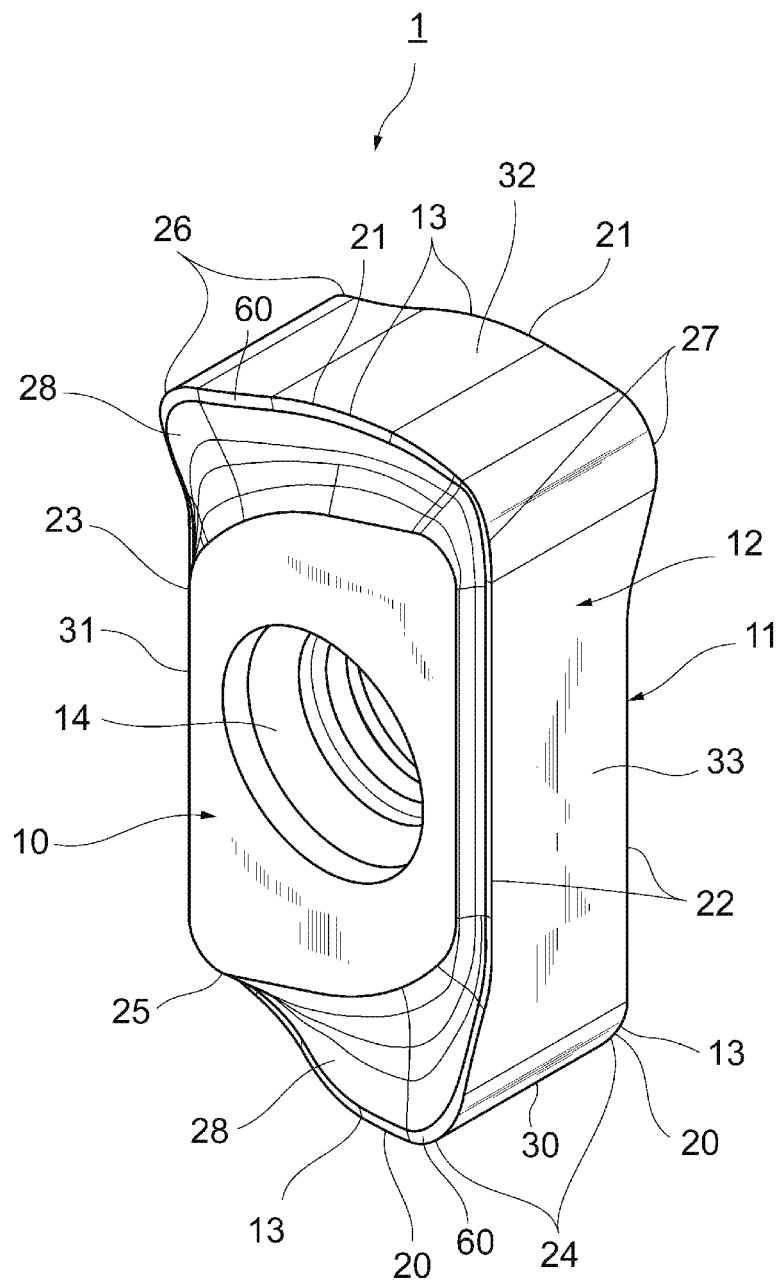
FIG. 1 is a perspective view of a cutting insert.

Hereinafter, a preferred embodiment of the present invention will be described with reference to the drawings. Note that same elements will be denoted by same reference characters and redundant descriptions will be omitted. Unless otherwise noted, positional relationships such as up, down, left, and right are to be based on positional relationships depicted in the drawings. In addition, dimensional ratios in the drawings are not limited to the depicted ratios. Furthermore, it is to be understood that the embodiment described below is for illustrative purposes only and is not intended to limit the present invention thereto.

Figure 2:
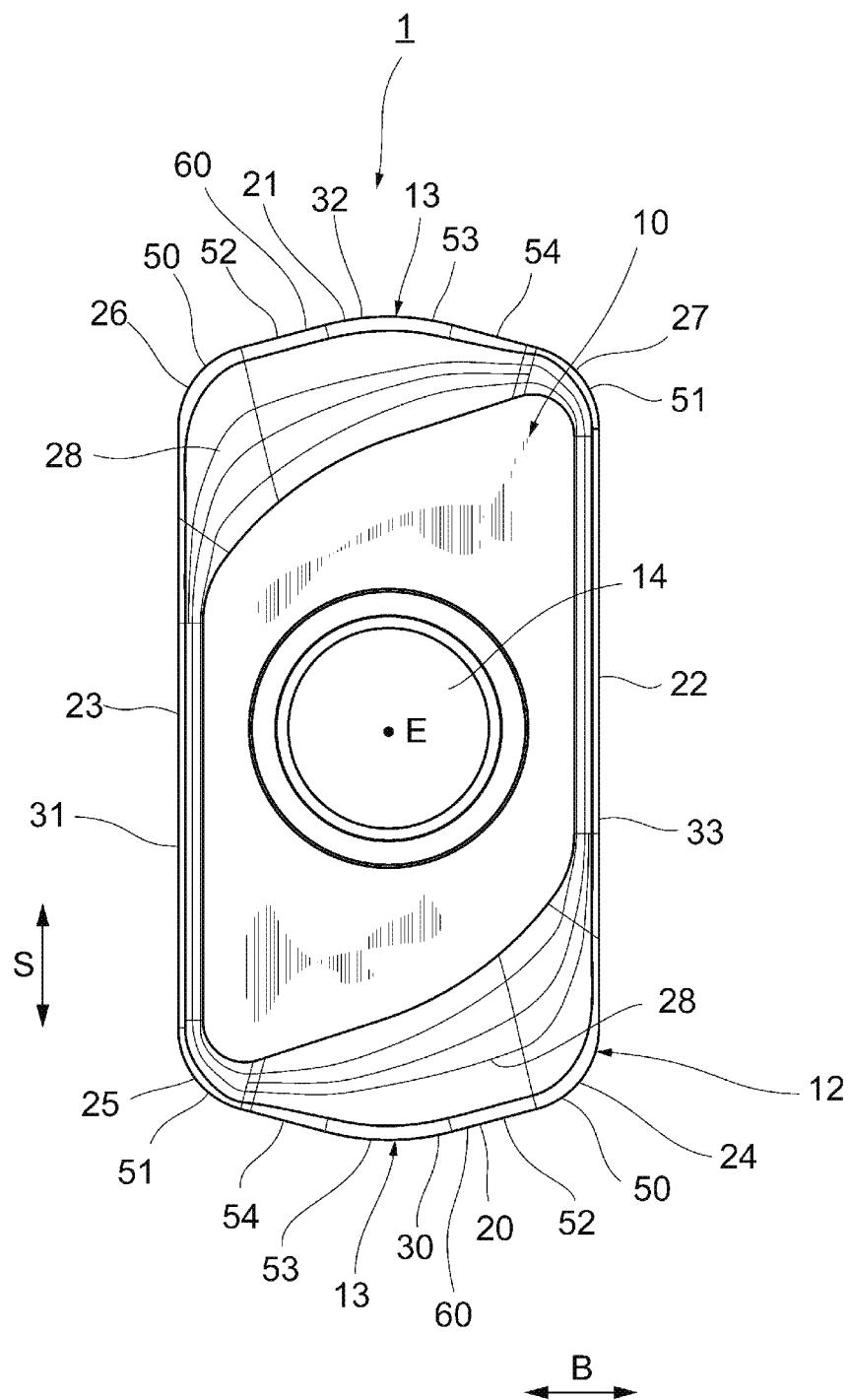
FIG. 2 is a front view of a cutting insert as viewed from a side of an end surface.
Figure 3:
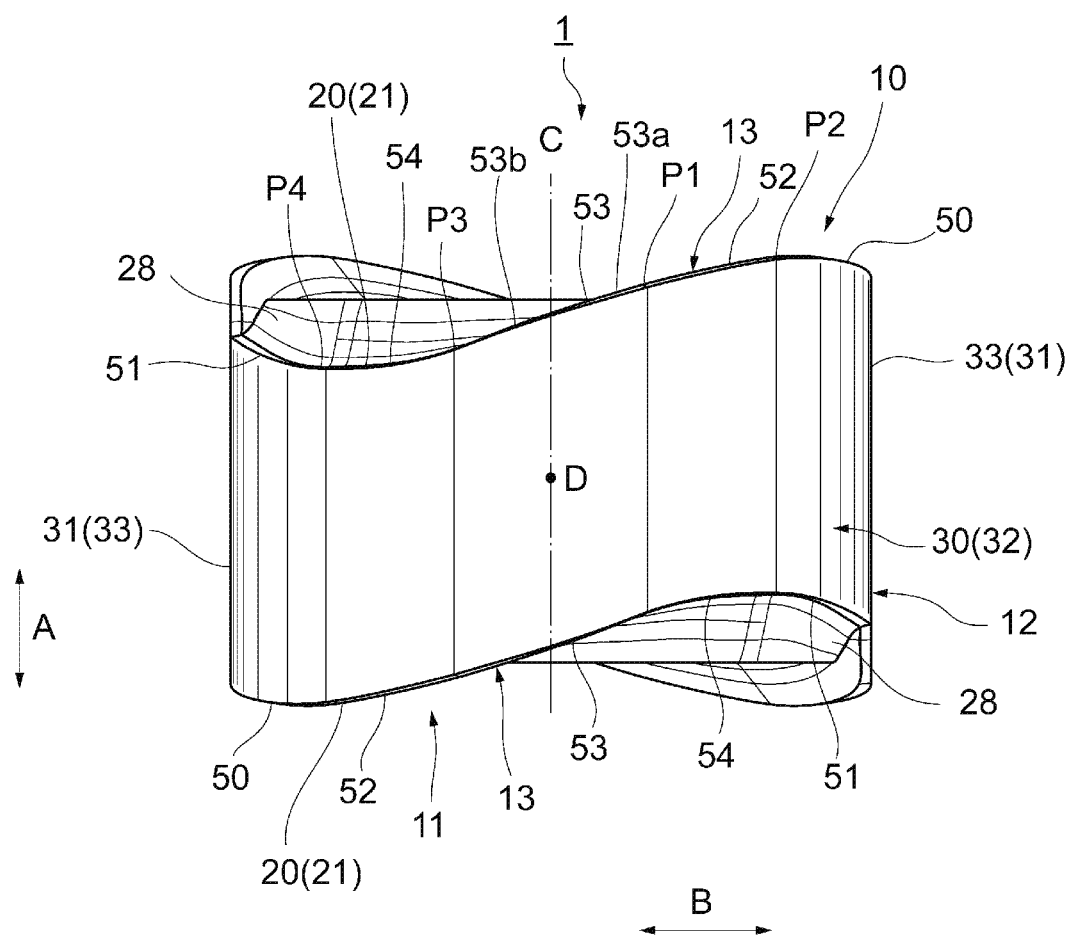
FIG. 3 is a side view of a cutting insert as viewed from a side of a peripheral side surface.

FIG. 1 is a perspective view of a cutting insert 1 according to the present embodiment, and FIG. 2 is a front view of the cutting insert 1 as viewed from a side of an end surface. FIG. 3 is a side view of the cutting insert 1 as viewed from a side of a peripheral side surface.

The cutting insert 1 is for, for example, an end mill suitable for high-feeding. As shown in FIGS. 1 and 2, the cutting insert 1 has a substantially rectangular parallelepiped shape. The cutting insert 1 is provided with: a first end surface 10 and a second end surface 11 opposing each other; a peripheral side surface 12 extending between the first end surface 10 and the second end surface 11; and a cutting edge 13 formed on a part of intersecting ridges between the two end surfaces 10 and 11 and the peripheral side surface 12. A fastening hole 14 penetrating in an end surface direction A (an up-down direction in FIG. 3) from the first end surface 10 toward the second end surface 11 is formed at a center of the cutting insert 1.

When viewed from a side of the end surfaces 10 and 11, the first end surface 10 and the second end surface 11 have an approximately rectangular shape. For example, as shown in FIG. 2, the first end surface 10 is provided with a pair of short sides 20 and 21 that oppose each other, a pair of long sides 22 and 23 that oppose each other, and four corners 24, 25, 26, and 27. A chip breaker (groove) 28 is provided along the cutting edge 13 (the short sides 20 and 21) on the first end surface 10. The second end surface 11 is configured in a similar manner to the first end surface 10.

The peripheral side surface 12 includes four peripheral side surface sections 30, 31, 32, and 33 that correspond to the respective sides of the approximately rectangular shapes of the end surfaces 10 and 11. For example, the peripheral side surface sections 30 and 32 correspond to the short sides 20 and 21 and are curved so as to protrude roughly outward as viewed from the side of the end surface 10. The peripheral side surface sections 31 and 33 correspond to the long sides 22 and 23 and are formed linearly parallel to each other as viewed from the side of the end surface 10.

As shown in FIGS. 1 to 3, for example, the cutting edge 13 is formed on an intersecting ridge (the short side 20) between the peripheral side surface section 30 and the end surfaces 10 and 11 and on an intersecting ridge (the short side 21) between the peripheral side surface section 33 and the end surfaces 10 and 11.

As shown in FIG. 2, for example, the cutting edge 13 between the peripheral side surface section 30 and the end surface 10 includes a first corner cutting edge 50 formed at the first corner 24, a second corner cutting edge 51 formed at the second corner 25, and a major cutting edge 52, an end cutting edge 53, and an inner cutting edge 54 as the first cutting edge which are arranged between the first corner cutting edge 50 and the second corner cutting edge 51 and which are connected to each other. Moreover, when the major cutting edge 52 is considered the first cutting edge, the inner cutting edge 54 corresponds to the second cutting edge. In other words, the cutting edge 13 continuously includes the first corner cutting edge 50, the major cutting edge 52, the end cutting edge 53, the inner cutting edge 54, and the second corner cutting edge 51 in this order from the first corner 24 toward the second corner 25. Moreover, in the present embodiment, the first corner cutting edge 50, the major cutting edge 52, and the end cutting edge 53 constitute a "cutting edge section".

Figure 4:
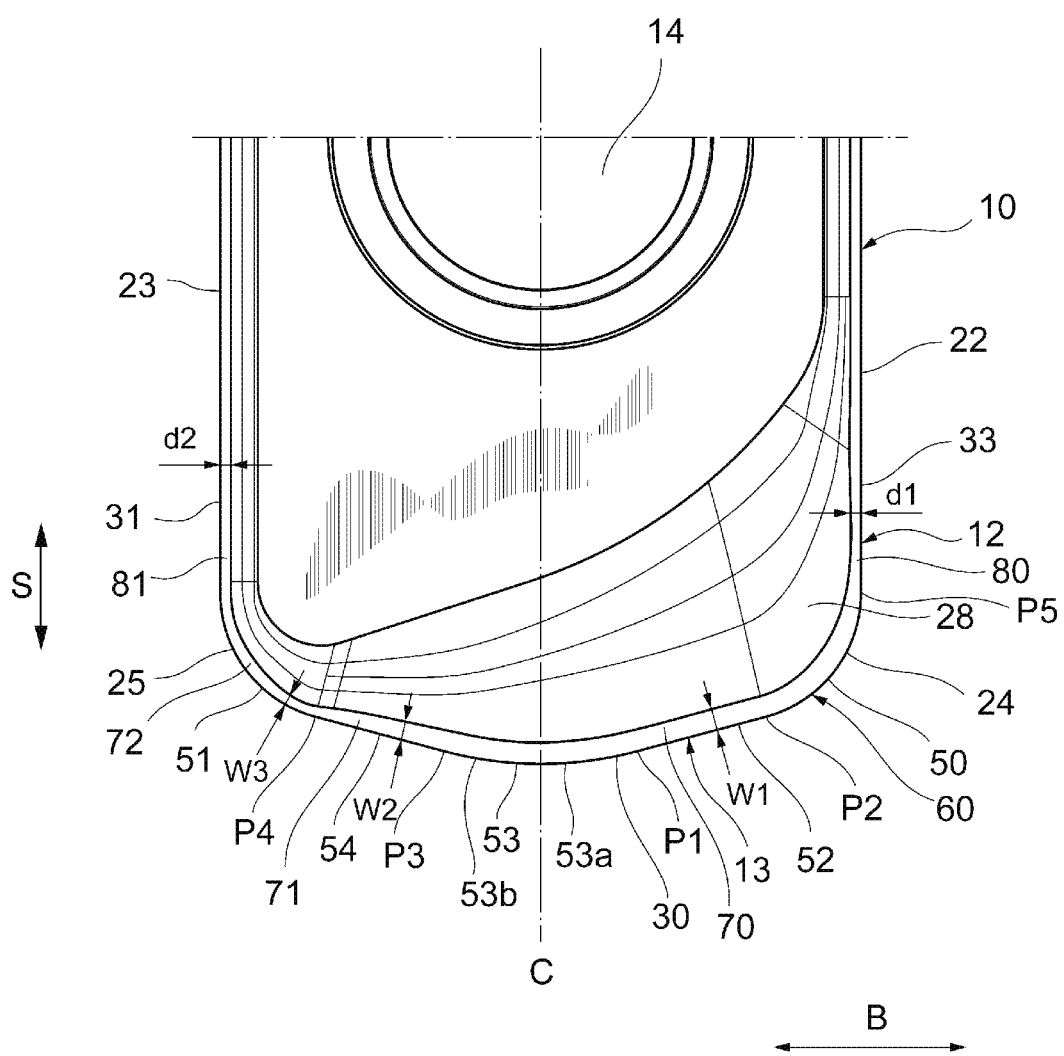
FIG. 4 is an enlarged view of a first end surface of a cutting insert.

As shown in FIG. 4, the first corner cutting edge 50 and the second corner cutting edge 51 are curved along shapes of the corners 24 and 25. The major cutting edge 52 has one end connected to the end cutting edge 53 (a connecting point P1) and another end connected to the first corner cutting edge 50 (a connecting point P2). For example, the major cutting edge 52 is linear as viewed from the side of the end surface 10. The end cutting edge 53 is formed in a circular-arc-shape that protrudes outward as viewed from the side of the end surface 10. The end cutting edge 53 is arranged so as to straddle a central virtual plane (a central line) C in a longitudinal direction S which passes through a center of the cutting insert 1 in a short side direction B. The inner cutting edge 54 has one end connected to the end cutting edge 53 (a connecting point P3) and another end connected to the second corner cutting edge 51 (a connecting point P4). For example, the inner cutting edge 54 is linear as viewed from the side of the end surface 10. Moreover, widths (lengths) of the major cutting edge 52, the end cutting edge 53, the inner cutting edge 54, the first corner cutting edge 50, and the second corner cutting edge 51 are appropriately set.

Figure 5:
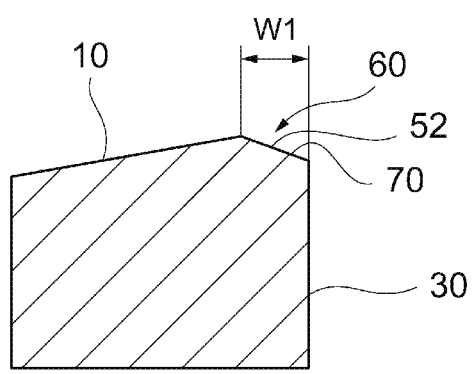
FIG. 5 is an explanatory diagram of a longitudinal section showing a shape of first honing of a major cutting edge.
Figure 6:
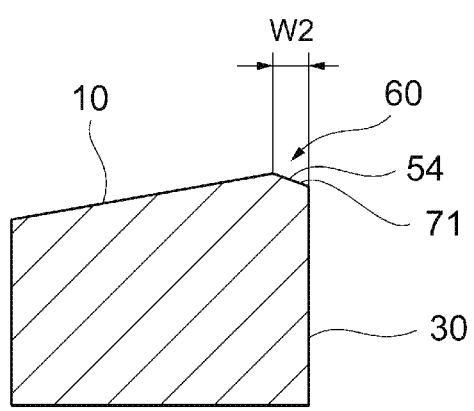
FIG. 6 is an explanatory diagram of a longitudinal section showing a shape of second honing of an inner cutting edge.

Honing 60 is applied to an entirety of the cutting edge 13. For example, as shown in FIGS. 5 and 6, the honing 60 is an inclined surface formed by chamfering a corner of the intersecting ridge between the first end surface 10 and the peripheral side surface section 30. The honing 60 has a wedge angle (an angle formed between a flank and the inclined surface created by honing) equal to or larger than 90 degrees. Alternatively, the honing 60 may be formed by cutting or formed using a mold. In addition, a small circular-arc-shape chamfer may be present at an intersection of the honing 60 and the flank (the peripheral side surface 30). A size (a radius) of the circular arc of the chamfer may be 0.01 mm to 0.05 mm and favorably 0.02 mm to 0.04 mm.

As shown in FIGS. 4 and 5, as viewed from the side of the end surface 10, a width w1 of first honing 70 of the first corner cutting edge 50, the major cutting edge 52, and the end cutting edge 53 (the cutting edge section) is constant and is, for example, 0.15 mm to 0.45 mm and favorably 0.2 mm to 0.25 mm. As shown in FIGS. 4 and 6, a width w2 of second honing 71 of the inner cutting edge 54 is narrower than the width w1 of the first honing 70 and is equal to or more than 0.1 mm and favorably 0.1 mm to 0.2 mm. As shown in FIG. 4, the width w2 of the second honing 71 gradually becomes narrower as a distance from the connecting point P3 to the end cutting edge 53 increases. A width w3 of third honing 72 of the second corner cutting edge 51 is approximately equivalent to the width w2 of the second honing 71 at the connecting point P4 to the inner cutting edge 54 (a minimum width of the second honing 71).

A cut surface 80 with chamfered corners is formed on the other intersecting ridge (the long side 22) between the first end surface 10 and the peripheral side surface section 33 which is connected to the first corner cutting edge 50. Moreover, the cut surface 80 may be formed by cutting or formed using a mold.

A width d1 of the cut surface 80 is narrower than the width w1 of the first honing 70 of the first corner cutting edge 50 and, for example, gradually becomes narrower as a distance from a connecting point P5 to the first corner cutting edge 50 increases and is subsequently constant. The width d1 of the cut surface 80 is set to a range of, for example, 0.1 mm to 0.2 mm.

A cut surface 81 with chamfered corners is formed on an intersecting ridge (the long side 23) between the first end surface 10 and the peripheral side surface section 31 which is connected to the second corner cutting edge 51. Moreover, the cut surface 81 may be formed by cutting or formed using a mold.

A width d2 of the cut surface 81 is approximately the same as the width w3 of the third honing 72 of the second corner cutting edge 51.

As shown in FIG. 3, as seen from a side of the peripheral side surface section 30, the end cutting edge 53 on the side of the end surface 10 straddles the central virtual plane (the central line) C in the end surface direction A which passes through the center of the cutting insert 1 in the short side direction B, and a first end (the connecting point P1) on a side of the major cutting edge 52 is positioned higher in the end surface direction A than a second end (the connecting point P3) on a side of the inner cutting edge 54.

The end cutting edge 53 on the side of the end surface 10 is provided with a first curve 53a protruding upward and a second curve 53b protruding downward which are continuous with each other as viewed from the side of the peripheral side surface section 30. The major cutting edge 52 curves so as to protrude upward and is smoothly connected to the first curve 53a. The inner cutting edge 54 curves so as to protrude downward and is smoothly connected to the second curve 53b.

As viewed from the side of the peripheral side surface section 30, for example, the first corner cutting edge 50 on the side of the end surface 10 curves so as to protrude upward and is smoothly connected to the major cutting edge 52. A vicinity of the connecting point P2 between the first corner cutting edge 50 and the major cutting edge 52 constitutes a highest point, and an outer end of the first corner cutting edge 50 turns slightly down. For example, the second corner cutting edge 51 curves so as to protrude downward and is smoothly connected to the inner cutting edge 54. A vicinity of the connecting point P4 between the second corner cutting edge 51 and the inner cutting edge 54 constitutes a lowest point, and an outer end of the second corner cutting edge 51 turns slightly up.

As shown in FIG. 3, the cutting edge 13 on the ridge between the peripheral side surface section 30 and the second end surface 11 has 180-degree rotational symmetry about a central axis D in the longitudinal direction S of the cutting insert 1 when the cutting edge 13 on the side of the first end surface 10 is viewed from the side of the peripheral side surface section 30, and has a similar configuration to the cutting edge 13 on the side of the first end surface 10. In other words, the cutting edge 13 between the peripheral side surface section 30 and the second end surface 11 continuously includes the first corner cutting edge 50, the major cutting edge 52, the end cutting edge 53, the inner cutting edge 54, and the second corner cutting edge 51 in this order from the second corner 25 toward the first corner 24.

The cutting edge 13 on the ridge between the peripheral side surface section 32 and the first end surface 10 and the cutting edge 13 on the ridge between the peripheral side surface section 32 and the second end surface 11 have 180-degree rotational symmetry about a central axis E (shown in FIG. 2) in the end surface direction A of the cutting insert 1 when the cutting edge 13 on the side of the peripheral side surface section 30 is viewed from the side of the end surface 10, and has a similar configuration to the cutting edge 13 on the side of the peripheral side surface section 30 as shown in FIG. 3.

With respect to a size of the cutting insert 1, for example, a horizontal width of the cutting insert 1 in the short side direction B is around 6 mm, and a vertical width S of the cutting insert 1 in a longitudinal direction is around 12 mm. A thickness (a width between end surfaces 10 and 11) of the cutting insert 1 is, for example, around 3.5 mm.

While a material of the cutting insert 1 is not particularly limited, for example, the material is selected from hard materials such as cemented carbide, cermet, ceramic, and a sintered body containing cubic boron nitride or materials obtained by applying PVD or CVD coating to the surface of these hard materials, or monocrystalline diamond or a sintered body including diamond.

Figure 7:
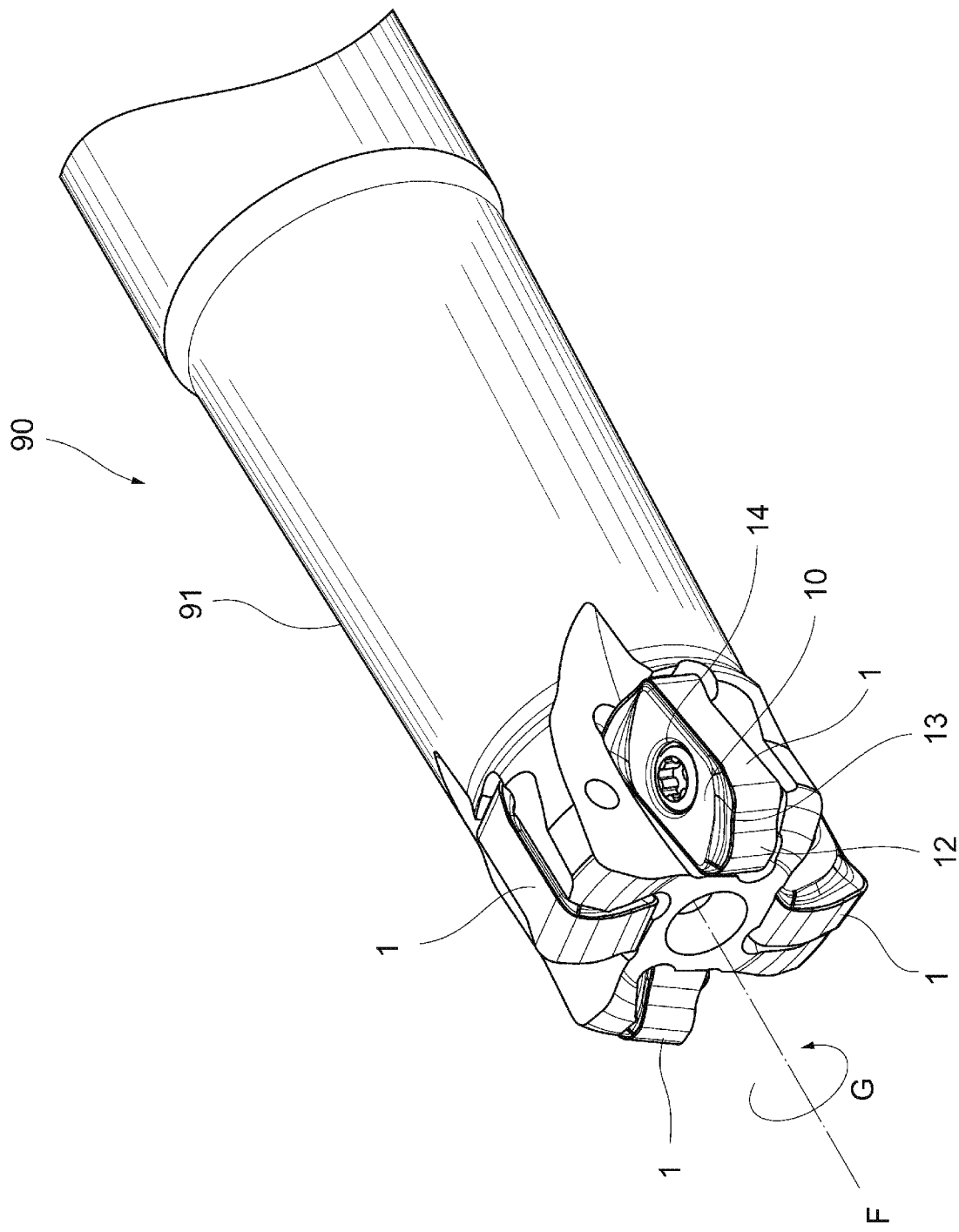
FIG. 7 is a perspective view of a cutting tool.
Figure 8:
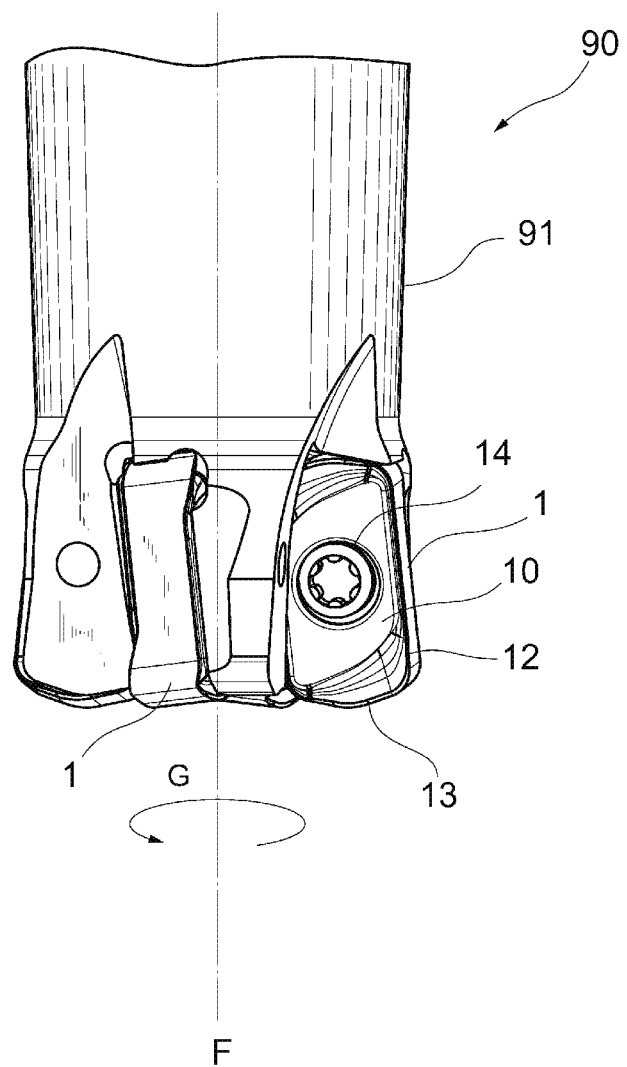
FIG. 8 is a side view of a cutting tool.

Next, a cutting tool 90 mounted with the cutting insert 1 will be described. The cutting tool 90 shown in FIGS. 7 and 8 is a milling tool such as an indexable end mill. The cutting tool 90 is provided with a tool body 91 and the cutting insert 1. The tool body 91 is formed in a columnar shape, and a central axis thereof constitutes a rotational axis F. The cutting insert 1 is mounted in plurality (for example, four) at regular intervals around the rotational axis F in a leading end part of the tool body 91. Moreover, the number of the cutting inserts 1 mounted to the tool body 91 is not limited to four. The cutting insert 1 is mounted in a state where the first end surface 10 or the second end surface 11 faces a direction of rotation G and the peripheral side surface section 30 or the peripheral side surface section 32 faces a side of the leading end of the cutting tool 90. During cutting, the tool body 91 is moved while being rotated and a cutting process is performed by bringing the cutting edge 13 of the cutting insert 1 into contact with a cut material. The major cutting edge 52 is mainly involved in cutting. For example, when performing cutting by moving the tool body 91 toward the leading end part (for example, downward in FIG. 8) or diagonally downward, the inner cutting edge 54 is involved in cutting.

According to the present embodiment, since the honing 60 is provided on the major cutting edge 52 and the inner cutting edge 54 of the cutting insert 1 and the width w2 of the second honing 71 of the inner cutting edge 54 is narrower than the width w1 of the first honing 70 of the major cutting edge 52 as viewed from the side of the end surfaces 10 and 11, an increase in cutting resistance and promotion of wear due to honing can be suppressed in the inner cutting edge 54 with a relatively low cutting load while suppressing fractures of the major cutting edge 52 and the inner cutting edge 54. Therefore, the cutting edge 13 can be provided with suitable honing 60.

Since the width w2 of the second honing 71 of the inner cutting edge 54, as viewed from the side of the end surfaces 10 and 11, becomes narrower as a distance from the connecting part P3 connected to the end cutting edge 53 increases, the width w2 of the second honing 71 decreases toward a portion with a small cutting load and, accordingly, the inner cutting edge 54 can be provided with more suitable honing.

Since the width w1 of the first honing 70 of the first corner cutting edge 50, the major cutting edge 52, and the end cutting edge 53 as viewed from the side of the end surfaces 10 and 11 is constant, the cutting edge 13 can be readily formed and fracture of the cutting edge 13 can be sufficiently suppressed.

Since the cut surface 80 is formed on an intersecting ridge (the long side 22) connected to the first corner cutting edge 50, as viewed from the side of the end surfaces 10 and 11 and the width d1 of the cut surface 80, is narrower than the width w1 of the first honing 70 of the first corner cutting edge 50, the cutting insert 1 can be formed more readily by forming the cut surface 80 that is continuous to the honing of the first corner cutting edge 50 on the long side 22. The formation of the cut surface 80 makes chipping less likely to occur when a chip gets caught. In addition, a portion in which the cut surface 80 is formed is strengthened, making chipping less likely to occur even when contact is made with a work surface during machining. Since the width d1 of the cut surface 80 is narrower than the width w1 of the first honing 70 of the first corner cutting edge 50, a breaker groove with a sufficient width can be provided, thereby enabling chip outflow to be controlled.

Since the width w2 of the second honing 71 of the inner cutting edge 54 is equal to or more than 0.1 mm, fracture of the inner cutting edge 54 can be sufficiently suppressed.

Although a preferable embodiment of the present invention has been described above with reference to the accompanying drawings, the present invention is not limited to the described embodiment. It will be appreciated that various modifications and alternations may become obvious to those skilled in the art within the ideas described in the claims, and that such modifications and alternations naturally belong to the technical scope of the present invention.

Figure 9:
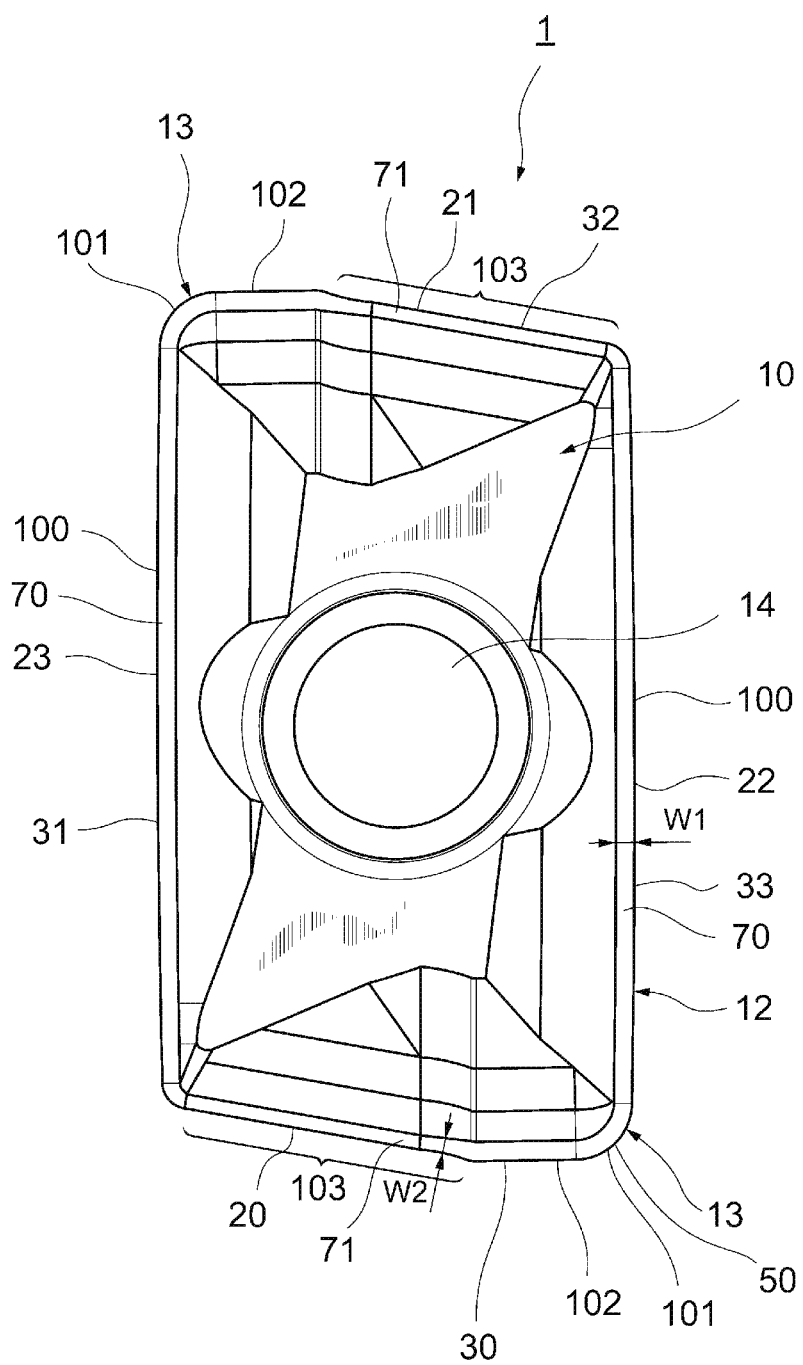
FIG. 9 is a front view of a cutting insert according to another aspect as viewed from a side of an end surface.
Figure 10:
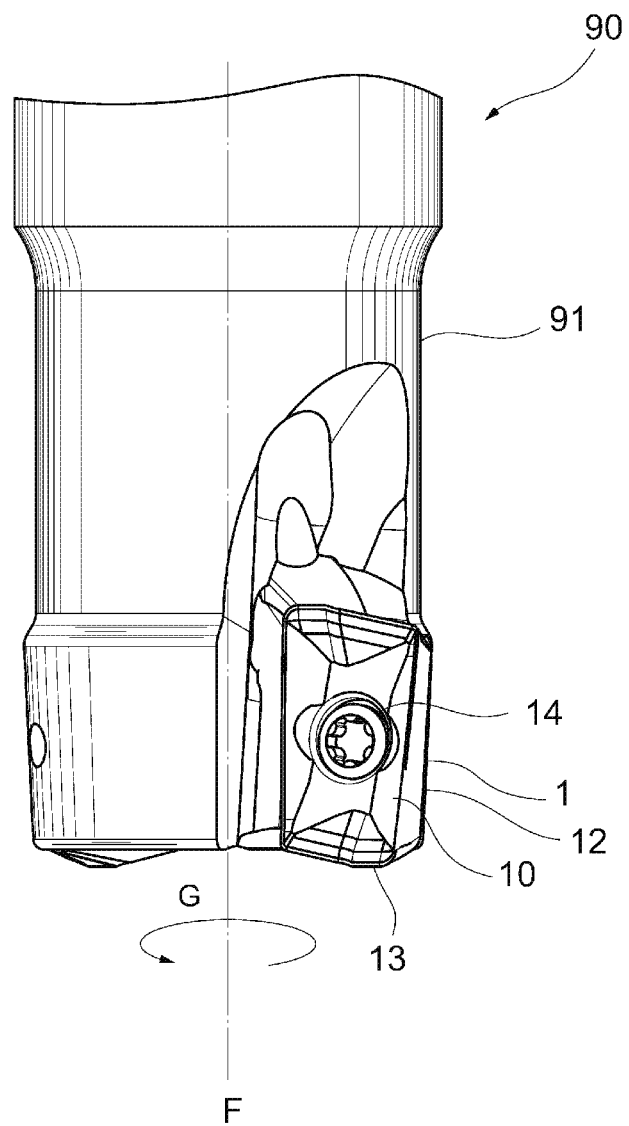
FIG. 10 is a side view of a cutting tool according to another aspect.

For example, configurations of the cutting insert 1 and the cutting edge 13 are not limited to those in the embodiment described above. For example, as shown in FIG. 9, the cutting edge 13 is formed from the intersecting ridge (the long side 22) between the peripheral side surface section 33 and the end surfaces 10 and 11 to the intersecting ridge (the short side 20) between the peripheral side surface section 30 and the end surfaces 10 and 11. For example, the cutting edge 13 may not be provided with an end cutting edge and may continuously include a major cutting edge 100, a corner cutting edge 101, a wiper edge (a minor cutting edge) 102, and an inner cutting edge 103 as a first cutting edge. In this case, the cutting edge section is constituted by the major cutting edge 100, the corner cutting edge 101, and the wiper edge 102. The major cutting edge 100 is formed on the long side 22, the corner cutting edge 101 is formed on the first corner 50, and the wiper edge 102 and the inner cutting edge 103 are formed on the short side 20. The width w2 of the second honing 71 of the inner cutting edge 103 is set narrower than the width w1 of the first honing 70 of the major cutting edge 100, the corner cutting edge 101, and the wiper edge 102. In addition, the cutting edge 13 may be formed at a position that is 180-degree rotationally symmetric about the fastening hole 14 or, in other words, from the intersecting ridge (the long side 23) between the peripheral side surface section 31 and the end surfaces 10 and 11 to the intersecting ridge (the short side 21) between the peripheral side surface section 32 and the end surfaces 10 and 11. Furthermore, the cutting edge 13 may be only formed on one end surface such as on the intersecting ridge between the first end surface 10 and the peripheral side surface sections 30 to 33. As shown in FIG. 10, the cutting insert 1 is mounted in plurality (for example, four) at regular intervals around the rotational axis F in a leading end part of the tool body 91 of the cutting tool 90. Even in this example, since the width w2 of the second honing 71 of the inner cutting edge 103 is narrower than the width w1 of the first honing 70 of the major cutting edge 100, an increase in cutting resistance and promotion of wear due to honing can be suppressed in the inner cutting edge 103 with a relatively low cutting load while suppressing fractures of the major cutting edge 100 and the inner cutting edge 103. Therefore, the cutting edge 13 can be provided with suitable honing.

While the cutting edge section connected to the inner cutting edge 54 in the embodiment described above is constituted by the first corner cutting edge 50, the major cutting edge 52, and the end cutting edge 53 or by the major cutting edge 100, the corner cutting edge 101, and the wiper edge 102, the cutting edge section may be solely constituted by a major cutting edge, a combination of a major cutting edge and an end cutting edge or a wiper edge, or a combination of a major cutting edge and another cutting edge. In addition, the cutting edge 13 need only be provided with a first cutting edge such as an inner cutting edge and a major cutting edge, and need not be provided with an end cutting edge or a corner cutting edge. The cut surfaces 80 and 81 may or may not be provided.

Moreover, a portion where a width of honing is relatively wide need not necessarily be a major cutting edge, and a portion with a relatively high cutting frequency, a relatively large cutting resistance, or the like in the cutting edge may be considered a first cutting edge, a portion with a relatively low cutting frequency, a relatively small cutting resistance, or the like in the cutting edge may be considered a second cutting edge, and a width of at least a part of the honing of the second cutting edge may be narrower than a width of the honing of the first cutting edge as viewed from the side of the end surface.

While the width w2 of the second honing 71 of the inner cutting edge 54 gradually becomes narrower as a distance from the connecting point P3 to the end cutting edge 53 increases in the embodiment described above, a shape of the second honing 71 is not limited thereto. In addition, while the width w1 of the first honing 70 is constant, the width w1 may vary instead. It should be noted that "constant" in the present embodiment also includes cases of slight variations of around 0.01 mm.

The cutting insert 1 is not limited to an approximately rectangular shape and may have a diamond shape. Alternatively, the cutting insert 1 may have a triangular shape, a pentagonal shape, a hexagonal shape, an octagonal shape, and the like. A position, a number, and dimensions of the cutting edge 13 are also not limited to those of the embodiment described above. While the cutting edge 13 is respectively provided on both end surfaces 10 and 11 of the cutting insert 1, the cutting edge 13 may only be provided on one of the end surfaces. While the cutting edge 13 is provided on two short sides of the respective end surfaces 10 and 11, the cutting edge 13 may be provided on one side or three sides which are a part of the sides of the end surfaces or on four sides which are all of the sides of the end surfaces.

While the cutting tool 90 described in the present embodiment is an indexable end mill, the present invention is not limited thereto and can also be applied to other cutting tools such as a milling cutter and a drill. While the cutting insert 1 according to the embodiments described above is a cutting insert for milling, the present invention is not limited thereto and may also be applied to turning. In a cutting insert for turning, the first cutting edge corresponds to a minor cutting edge.

The present invention is useful for providing a cutting insert in which suitable honing is formed on a cutting edge.

What is claimed is:

1. A cutting insert, comprising:
   first and second end surfaces that oppose each other;
   a peripheral side surface extending between the first and second end surfaces; and
   a cutting edge formed on an intersecting ridge between the first end surface and the peripheral side surface, wherein
   the cutting edge continuously includes a first corner cutting edge, a major cutting edge, an end cutting edge, an inner cutting edge, and a second corner cutting edge in this order,
   honing is provided on the first corner cutting edge, the major cutting edge, the end cutting edge, the inner cutting edge, and the second corner cutting edge,
   a width of the honing of the inner cutting edge is narrower than a width of the honing of the first corner cutting edge, the major cutting edge, and the end cutting edge, as viewed from a side of the first end surface,
   the intersecting ridge includes first and second intersecting ridges,
   the first corner cutting edge is connected to the first intersecting ridge between the first end surface and the peripheral side surface, the first intersecting ridge being located on an opposite side to the major cutting edge, and
   the second corner cutting edge is connected to the second intersecting ridge between the first end surface and the peripheral side surface, the second intersecting ridge being located on an opposite side to the inner cutting edge.

2. The cutting insert according to claim 1, wherein a width of the honing of the inner cutting edge and the second corner cutting edge is narrower than a width of the honing of the first corner cutting edge, the major cutting edge, and the end cutting edge.

3. The cutting insert according to claim 1, wherein a width of the honing of the second corner cutting edge is equivalent to a width of the honing at a connecting part of the inner cutting edge which is connected to the second corner cutting edge.

4. The cutting insert according to claim 1, wherein
   the first intersecting ridge and the second intersecting ridge respectively include cut surfaces,
   a width of the cut surface of the first intersecting ridge, as viewed from the side of the first end surface, is narrower than a width of the honing of the first corner cutting edge, and
   a width of the cut surface of the second intersecting ridge, as viewed from the side of the first end surface, is the same as a width of the honing of the second corner cutting edge.

5. The cutting insert according to claim 1, wherein the width of the honing of the inner cutting edge, as viewed from the side of the first end surface, gradually increases between a connecting part connected to the second corner cutting edge and a connecting part connected to the end cutting edge.

6. The cutting insert according to claim 1, wherein the width of the honing of the first corner cutting edge, the major cutting edge, and the end cutting edge, as viewed from the side of the first end surface, is constant.

7. The cutting insert according to claim 1, wherein the width of the honing of the inner cutting edge, as viewed from the side of the first end surface, is equal to or more than 0.1 mm.

8. A cutting tool, comprising:
   a tool body; and
   the cutting insert according to claim 1 mounted to the tool body.

* * * * *